United States Patent Office

3,395,140
Patented July 30, 1968

3,395,140
SHORTENING TIME REQUIRED FOR XANTHATE-CAUSTIC SLURRY FORMATION
Richard P. Williams, Lowland, Tenn., assignor to American Enka Corporation, Enka, N.C., a corporation of Delaware
No Drawing. Filed May 2, 1966, Ser. No. 546,589
6 Claims. (Cl. 260—218)

ABSTRACT OF THE DISCLOSURE

Improvements in the process of forming xanthate-caustic slurries wherein cellulose xanthate is produced under vacuum comprising immediately breaking the vacuum in a xanthating vessel (churn or baratte) containing alkali cellulose crumbs at the end of the xanthation cycle by passing inert gas to the vessel and thereafter rapidly introducing caustic solution to said vessel.

---

This invention relates to a method for rapidly preparing a slurry of cellulose xanthate in the production of viscose solutions. More particularly, this invention relates to an improved method for forming a xanthate slurry in a "wet churn" or a like vacuum xanthation unit which can be dumped or discharged quickly and cleanly from the churn.

In the production of viscose, several steps are conventionally followed in the more widely accepted commercial processes. In general, essentially purified cellulose in the form of wood pulp sheets, cotton linters, or mixtures of these materials is commonly steeped, i.e., immersed, in an aqueous caustic solution having a concentration of from about 18 to 19% by weight of sodium hydroxide for a period varying from about 30 minutes to 90 minutes at a controlled reaction temperature. Subsequently, excess caustic solution is removed and the alkali cellulose thus formed by reaction between the cellulose and the caustic is pressed to remove additional caustic solution. The pressed alkali cellulose is then shredded into fluffy crumbs.

The crumbs of alkali cellulose are stored or aged under control conditions for several hours to decrease the chain length of the cellulose molecule and to thereby regulate the viscosity of the final viscose spinning solution.

The aged crumbs of alkali cellulose which usually contain from about 12 to 20% by weight of sodium hydroxide are then converted to cellulose xanthate by reaction in a closed chamber such as a churn or the like with carbon bisulfide. Usually, a partial vacuum is applied to the churn before the carbon bisulfide is added. After the xanthation reaction, the cellulose xanthate which is now soluble in a caustic solution is usually passed to a dissolver unit where a dilute caustic solution is mixed with the xanthate. The resulting alkaline solution (which is known as "viscose") has an orange color and may have a cellulose content of from 6 to 9 percent by weight and a sodium hydroxide content of from 4 to 8 percent by weight. The viscose solution may be blended with other viscose solutions, filtered several times to remove undissolved particles and then allowed to set or ripen for a period of several hours at approximately room temperature. The ripened viscose solution thus produced is then deaerated and used as a viscose spinning solution.

It will be appreciated that xanthation of the alkali cellulose is a primary step in the viscose process and as such it greatly influences the time required for producing the final viscose spinning solution and also determines the quality of viscose produced. Of the many xanthation processes conventionally used on a commercial scale, one is commonly known as the "wet churn" method. The term "wet churn" is descriptive of this method in that following xanthation of successive batches of alkali cellulose, aqueous alkali solutions or water are introduced into a churn and are mixed with the cellulose to form alkaline slurries which are then dumped or discharged into the dissolver unit. This invention is particularly concerned with an improved method for reducing the time required for preparing a slurry that can be dumped quickly and cleanly from such "wet churns."

Heretofore, during the production of viscose spinning solutions in which "wet churns" are used as vacuum xanthation units, it has been the normal practice to charge the churn with a batch of alkali cellulose and thereafter apply a vecuum to the churn before the addition of carbon bisulfide. After the carbon bisulfide has been added and after completion of the xanthation reaction (which causes the alkali cellulose to be transformed into yellow, sticky cellulose xanthate crumbs), the churn usually will have a vacuum of about 15 to 25 inches of mercury. At this time if air is admitted to break the vacuum, an explosion will usually occur.

Accordingly, in the normal practice cold dissolving lye, i.e., solution of sodium and potassium hydroxide or water, is allowed to gradually enter the churn without breaking the vacuum to form a slurry of alkaline xanthate.

It will be recognized that as the cold lye enters the churn the vacuum is gradually reduced because of the volume increase caused by the addition of the dissolving lye to the churn. Furthermore, during initial lye addition, the outside portions of a mass of yellow xanthate crumbs are wetted before the vacuum is reduced very much and before the lye is allowed to penetrate into the mass of yellow crumbs.

Consequently, as the vacuum is reduced to zero on the outside of a mass of yellow crumbs, the difference in pressure between the outside and the inside of the mass causes the yellow crumbs to be compacted into a large ball of material containing unwetted yellow crumbs on the inside. In order to break up these balls of material before passing the xanthate slurry to the xanthate dissolver unit, it is necessary for the blades of the churn to run at high speeds. During this type of operation, it has been found that the formation of large balls of cellulose xanthate often necessitates prolonged periods of mixing in the churn and also tends to cause substantial amounts of the xanthate to cling to the walls of the churn. This residue is very difficult to remove and requires prolonged mixing times for the churn rinsing cycles that follow dumping of the xanthate slurry.

In accordance with this invention, there is provided a method for rapidly forming a slurry from cellulose xanthate in a "wet churn" which overcomes many of the problems of the prior art.

In particular, this invention contemplates a method for producing a cleanly dischargeable or dumpable slurry from cellulose xanthate produced under a vacuum in a churn by passing inert gas into a churn containing discrete particles of cellulose xanthate to immediately break its vacuum at the end of the xanthation cycle, by rapidly adding a caustic solution or water to the churn and by mixing the caustic solution or water with the xanthate for a short period of time to form a slurry that can be cleanly discharged or dumped from the churn; the breaking of the vacuum preventing balling of the xanthate upon addition of the caustic solution or water so that the cleanly dischargeable slurry is produced without prolonged mixing in the churn.

Furthermore, this invention is also concerned with a method for producing high quality viscose solutions wherein alkali cellulose is xanthated under a vacuum by reaction with carbon bisulfide at high temperatures and for relatively short xanthation cycles in a churn or like xanthation unit, the vacuum in the churn is immediately broken by admitting an inert gas after xanthation is completed, then a cold caustic solution is rapidly added to the churn and admixed with the xanthate crumbs therein to produce a cleanly dischargeable slurry free of large balls of xanthate crumbs, the slurry is discharged to a dissolver unit with very small amounts of cellulose left in the churn and the slurry then is converted to a viscose solution in the dissolver unit.

It will be appreciated that in contrast to the gradual reduction of vacuum by the prior art practice, immediate breaking of the vacuum prior to introducing the caustic solution allows the solution to thoroughly wet and rapidly penetrate the xanthate particles. In this manner, it is believed that an adverse pressure differential between the inside and the outside of the mass of xanthate particles is prevented.

It has been found that rapid formation of the xanthate slurry and its removal from the "wet churn" by the method of this invention, permits the reaction conditions used to effect xanthation of the alkali cellulose to reduce the xanthation cycle without causing the resulting products to stick to the walls of the churn which heretofore prevented clean discharge or dumping. Thus it has been found that higher xanthation temperatures, i.e., from about 30° to 50° C. may be employed to reduce the time cycle required for xanthating the alkali cellulose under a vacuum of from about 15 to 27 inches of mercury. Usually the reaction times at the higher temperatures may vary from about 30 minutes to one and one-half hours depending on the temperature, rate of introducing carbon bisulfide into the churn and the mixing speeds (r.p.m.) of the blades in the churn.

As previously noted, the xanthation unit, i.e., a churn, rotating drum, or the like is evacuated prior to the addition of the carbon bisulfide in order to remove substantially all of the air contained therein. The resulting partial vacuum reduces oxidation and causes vaporization of the carbon bisulfide to facilitate its reaction with the alkali cellulose. Thus, it will be appreciated that the crumbs or shreds of alkali cellulose within the churn are not easily wetted by liquid carbon bisulfide; whereas the vaporized carbon bisulfide more easily and completely penetrates the alkali cellulose crumbs. Xanthation under vacuum also allows the vapor formed from the carbon bisulfide to uniformly disperse throughout the churn whereby the required amount of carbon bisulfide is uniformly and completely reacted with the alkali cellulose. Furthermore, the resulting xanthate product is readily soluble in a caustic solution.

Generally the amount of carbon bisulfide charged to the xanthation churn may differ with the other reaction conditions and the quality of the product, but usually from about 30 to 60 pounds of carbon bisulfide per 100 pounds of cellulose contained in the alkali cellulose are added in the churn. It will be understood that the carbon bisulfide often is introduced as a liquid which is subsequently vaporized at the temperature and pressure conditions usually present in the xanthation churn.

The speed of the mixing blades in the churn, likewise may be varied over a considerable range. Usually the churn blades agitate at speeds of from about 5 r.p.m. to 50 r.p.m., with the higher speeds being preferred for forming a slurry of the cellulose xanthate and cold caustic solution after the vacuum in the churn is broken.

The inert gases used to break the vacuum in the churn must be substantially free of oxygen-containing or other reactive gases. Among the suitable gases that may be used to break the vacuum within the churn are nitrogen, argon, helium and the like; with nitrogen being the most preferred because of its cost and availability. It will also be appreciated that the vacuum may be also broken by admitting additional carbon bisulfide into the churn since the relatively small amount of gas necessary will not increase the amount of unreacted carbon bisulfide outside of acceptable limits.

In accordance with this invention the vacuum within the xanthating churn is immediately broken by admitting an inert gas. In general, the gas is introduced at a rate which requires less than about 60 seconds to break the vacuum. It will be appreciated that this substantially instant destruction of the vacuum greatly reduces the time normally required by conventional methods and also allows rapid introduction of a caustic solution or water to promote formation of a flowable slurry that can be cleanly dumped.

The caustic solution which is introduced into the churn to form the xanthate slurry and to initiate dissolving of the xanthate prior to dumping is usually a dilute solution of sodium and/or potassium hydroxide having a concentration varying from about 1 to 7% by weight of the solution. The temperature of the dissolving caustic solution is substantially below that in the xanthating churn and is usually at a temperature from about 0° to 15° C. It will be appreciated that it is desirable to cause the temperature of the slurry to be from about 10° to 20° C. in order to promote more rapid dissolving of the cellulose xanthate when it is dumped into the dissolver unit. Usually, enough caustic solution is mixed with the xanthate to form a slurry that will flow freely through the dump valve.

In accordance with this invention, it has been found that a cleanly dumpable xanthate slurry is rapidly formed after introduction of the caustic solution as quickly as practical. For example, about ½ to 1 minute of high speed mixing (i.e., 49 r.p.m.) is usually required to form a slurry that can be cleanly dumped into a dissolver unit. In contrast, the time required by conventional methods in which the vacuum is slowly broken by gradual introduction of the caustic solution may take 5 or more minutes of the same high speed mixing to produce a slurry suitable for dumping from the churn. Approximately 9 minutes heretofore was normal.

This invention will be more clearly understood by referring to the following example:

EXAMPLE

In this example viscose spinning solutions are prepared using this invention and a conventional "wet churn" method.

Approximately 500 pounds of cellulose in the form of wood pulp sheets are steeped in a 18–19% sodium hydroxide solution. The resulting alkali cellulose sheets are pressed to expel excess caustic solution to provide a pressed weight of approximately 3 times their original weight. The sheets are then shredded into fine crumbs which are fed into a closed container to age. The crumbs are then aged for approximately 2 days at 27° C. to obtain an ultimate viscose viscosity of approximately 75 poises when measured at 20° C. The aged crumbs are then loaded into a churn used as a vacuum xanthation unit.

Runs A, B and C are conducted. In Run A, the alkali cellulose crumbs are xanthated and the xanthate formed into a slurry by the conventional wet churn method. In Run B, the same reaction conditions are used to xanthate the alkali cellulose, but the xanthate slurry is formed by the method of this invention. In Run C, the alkali crumbs are xanthated at higher temperatures and with a shorter xanthation cycle than in Run A and are then formed into a slurry in accordance with this invention.

In Run A, the churn is evacuated to a vacuum of from 20 to 27 inches of mercury and carbon bisulfide (from about 0.30 to about 0.45 pound per pound of cellulose in the alkali cellulose charge) is added to the churn. The cellulose crumbs are continuously agitated to facilitate the xanthation reaction. After 75 minutes, the xanthate sulfur substitution has reached the desired level. Then 3660 pounds of a caustic solution having a concentration of 3.0% sodium hydroxide at a temperature of 8° C. are slowly introduced into the churn until the vacuum is reduced to zero. Then the speed of the blades is increased from 7 r.p.m. to 49 r.p.m. After 5 minutes at this mixing speed, the xanthate is discharged as a slurry to a dissolver unit. Additional caustic is added as an "A" and "B" rinse to effectively clean the churn to produce a viscose having a cellulose content of about 6–8% by weight. "A" rinse uses approximately 850 pounds dissolving lye. "B" rinse uses approximately 1500 pounds of dissolving lye. "A" rinse mixes 6 minutes at high speed. "B" rinse mixes 1 minute at high speed.

The additional caustic has a sodium hydroxide content of about 5–7% by weight. The viscose is then ripened, filtered and deaerated to produce the final desired spinning solution.

In Run B, the churn is evacuated to a vacuum similar to that produced in Run A, and carbon bisulfide (from about 0.30 to about 0.45 pound per pound of cellulose) is added to the churn. At the end of xanthation of the alkali crumbs (under the same conditions and for the same reaction cycle as Run A), nitrogen gas is passed into the churn to immediately reduce its vacuum to zero. Then 3660 pounds of a sodium hydroxide solution having a concentration of about 3% at a temperature of 8° C. are introduced into the churn. The cellulose xanthate and the sodium hydroxide solution are uniformly mixed at a churn speed of 49 r.p.m. for approximately 1 minute. The resulting slurry is cleanly discharged from the churn into a dissolving unit and processed as the xanthate from Run A to produce a viscose spinning solution.

Run C is similar to Run B with the exception that the temperature during xanthation is raised to 34° C. and the xanthation cycle is shortened to 65 minutes. In each run, the amount of cellulose residue left in the churn is observed.

As shown in the following table, the method of this invention substantially shortens the time required to form a cleanly dumpable slurry from cellulose xanthate produced under a vacuum and also substantially reduces the cellulose residue left in the churn. In addition, by rapidly forming such slurries, substantially higher xanthation temperatures and shorter reaction times are possible while still producing a high quality viscose. Moreover, the method increases the filterability of the viscose approximately 100%.

TABLE

| | Run A[1] | Run B[2] | Run C[2] |
|---|---|---|---|
| | Minutes | Minutes | Minutes |
| Vacuum Time | 10 | 10 | 10 |
| Xanthation Time | 75 | 75 | 65 |
| Vacuum Break Time | | 1 | 1 |
| Slurry Lye Addition Time | 9 | 3¼ | 3¼ |
| Slurry Mixing Time | 5 | 1 | 1 |
| "A" Rinse Lye Addition Time | ¾ | ¾ | ¾ |
| "A" Rinse Mixing Time | 6 | 1 | 1 |
| "B" Rinse Lye Addition Time | 1¼ | 1¼ | 1¼ |
| "B" Rinse Mixing Time | 1 | 1 | 1 |
| | 108 | 94¼ | 84¼ |

[1] Crumb residue sticking to walls and blades.
[2] Little or no crumb residue sticking to walls and blades.

While the novel features of the invention have been described and are pointed out in the appended claims, it is to be understood that various modifications and alterations may be made by those skilled in the art without departing from the spirit and scope of the invention.

What is claimed is:

1. A method of treating cellulose xanthate produced under a vacuum in a vessel to rapidly form a cleanly dischargeable xanthate slurry, which comprises immediately breaking the vacuum in a vessel containing discrete particles of cellulose xanthate at the end of the xanthation cycle by passing inert gas to the vessel, rapidly introducing a charge of caustic solution to said vessel, and also mixing said caustic solution with the xanthate to form a cleanly dischargeable slurry, said breaking of the vacuum preventing balling of the xanthate upon the rapid introduction of the caustic solution whereby the cleanly dischargeable slurry is produced without prolonged mixing in said vessel.

2. The method of claim 1 in which the inert gas is nitrogen.

3. The method of claim 1 in which the vacuum in the vessel is immediately broken within a few seconds after the inert gas in admitted to the churn.

4. The method of claim 1 in which the vacuum in the vessel is immediately broken within a few seconds after the inert gas is admitted to the vessel.

5. The method of claim 1 in which the caustic solution and the particles of cellulose xanthate are mixed by high speed rotation of the blades in the vessel for a period of approximately 30 seconds to one minute before the cleaning dischargeable slurry is formed.

6. The method of claim 1 in which the cellulose xanthate is produced under a vacuum in said vessel by reaction between alkali cellulose and carbon bisulfide at a temperature from about 30° C. to 50° C. and for a xanthation cycle of from about 30 minutes to 1½ hours.

References Cited

UNITED STATES PATENTS 1,942,346  1/1934  Scheller _____ 106—40
2,126,044  8/1938  Rolleston _____ 260—216
2,985,647  5/1961  Kohorn _____ 260—217

OTHER REFERENCES

Ott & Spurlin, "Cellulose," Interscience Publishers (N.Y.) (1954), p. 970.

JULIUS FROME, *Primary Examiner.*

H. H. FLETCHER, *Assistant Examiner.*